United States Patent
Ratnakaram et al.

(10) Patent No.: US 11,757,649 B2
(45) Date of Patent: Sep. 12, 2023

(54) ENHANCED AUTHENTICATION FRAMEWORK USING MULTI-DIMENSIONAL HASHING

(71) Applicant: BANK OF AMERICA CORPORATION, Charlotte, NC (US)

(72) Inventors: Udaya Kumar Raju Ratnakaram, Telangana (IN); Sandeep Kumar Chauhan, Telangana (IN); Sriram Balasubramanian, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 282 days.

(21) Appl. No.: 17/402,851

(22) Filed: Aug. 16, 2021

(65) Prior Publication Data
US 2023/0047229 A1 Feb. 16, 2023

(51) Int. Cl.
*H04L 29/06* (2006.01)
*H04L 9/32* (2006.01)
*H04L 9/40* (2022.01)

(52) U.S. Cl.
CPC ........ *H04L 9/3236* (2013.01); *H04L 63/0861* (2013.01)

(58) Field of Classification Search
CPC ... H04L 9/3236; H04L 63/0861; H04L 63/08; H04L 63/105; H04L 63/123; H04L 9/3239
See application file for complete search history.

(56) References Cited

U.S. PATENT DOCUMENTS

| | | | |
|---|---|---|---|
| 6,748,366 B1 | 6/2004 | Hurwitz et al. |
| 7,822,209 B2 | 10/2010 | Fu et al. |
| 7,904,718 B2 | 3/2011 | Giobbi et al. |
| 7,992,203 B2 | 8/2011 | Relyea |
| 8,074,265 B2 | 12/2011 | Relyea |
| 3,098,829 A1 | 1/2012 | Fu et al. |
| 3,099,765 A1 | 1/2012 | Parkinson |
| 3,166,532 A1 | 4/2012 | Chowdhury et al. |
| 8,180,741 B2 | 5/2012 | Relyea |
| 8,332,637 B2 | 12/2012 | Relyea |
| 8,356,342 B2 | 1/2013 | Parkinson et al. |
| 8,364,952 B2 | 1/2013 | Ho et al. |

(Continued)

*Primary Examiner* — Mahfuzur Rahman
(74) *Attorney, Agent, or Firm* — Moore & Van Allen PLLC; Anup Shrinivasan Lyer (57) ABSTRACT

Systems, computer program products, and methods are described herein for enhanced authentication framework using multi-dimensional hashing. The present invention is configured to electronically receive, from a computing device of a user, a resource transfer request; retrieve, from an authentication database, a multi-dimensional hash for a first set of data files for the user and a user identification artifact; retrieve, from the computing device of the user, a second set of data files matching the user identification artifact; initiate an asynchronous hash processing engine on the second set of data files; generate, using the asynchronous hash processing engine, a multi-dimensional hash for the second set of data files; compare the multi-dimensional hash for the first set of data files with the multi-dimensional hash for the second set of data files to determine a match; and authorize the resource transfer request based on at least determining the match.

20 Claims, 3 Drawing Sheets

(56) References Cited

U.S. PATENT DOCUMENTS

| | | |
|---|---|---|
| 8,380,177 B2 | 2/2013 | Laracey |
| 8,412,927 B2 | 4/2013 | Kwan et al. |
| 8,495,380 B2 | 7/2013 | Fu et al. |
| 8,589,695 B2 | 11/2013 | Parkinson et al. |
| 8,615,663 B2 | 12/2013 | Buer |
| 8,707,024 B2 | 4/2014 | Kwan et al. |
| 8,787,566 B2 | 7/2014 | Relyea |
| 8,806,219 B2 | 8/2014 | Relyea et al. |
| 8,977,844 B2 | 3/2015 | Parkinson et al. |
| 9,038,154 B2 | 5/2015 | Lord et al. |
| 9,137,012 B2 | 9/2015 | Bailey et al. |
| 9,769,158 B2 | 9/2017 | Kwan et al. |
| 10,311,459 B1 | 6/2019 | Babao et al. |
| 10,475,129 B2 | 11/2019 | Cole et al. |
| 10,482,449 B1 | 11/2019 | Gantert |
| 2007/0255951 A1 | 11/2007 | Grynberg |
| 2012/0173663 A1* | 7/2012 | Kammerer .......... H04L 63/0407 709/217 |
| 2014/0074719 A1* | 3/2014 | Gressel ................ G06Q 30/06 713/168 |
| 2015/0067796 A1* | 3/2015 | Hayes .................. H04L 63/126 726/6 |
| 2017/0214690 A1* | 7/2017 | Hayes ...................... H04L 9/12 |
| 2018/0102947 A1* | 4/2018 | Bhaya ................... H04L 67/10 |
| 2018/0197167 A1 | 7/2018 | Ganesan |
| 2018/0349567 A1* | 12/2018 | Kim ....................... G06Q 10/10 |
| 2020/0036757 A1* | 1/2020 | Hayes ................ H04L 63/0236 |
| 2020/0193435 A1 | 6/2020 | Spector et al. |
| 2021/0314366 A1* | 10/2021 | Hayes ................ H04L 63/0485 |
| 2023/0047229 A1* | 2/2023 | Ratnakaram .......... H04L 63/123 |

\* cited by examiner

ENHANCED AUTHENTICATION FRAMEWORK USING MULTI-DIMENSIONAL HASHING

FIELD OF THE INVENTION

The present invention embraces a system for enhanced authentication framework using multi-dimensional hashing.

BACKGROUND

Peer-to-peer (P2P) payments are instant digital transfers that make it simple and secure to transact with friends, family, trusted businesses and professionals without a dedicated payment instrument such as a card, or check, or traditional multi-step wire transfer process. Authenticated access to current peer-to-peer digital payment networks typically require means of identification that are often also used in other transactions, thus reducing their effectiveness in being strong authentication credentials. Therefore, there is a need to identify other means of authentication that may be in the form of invisible layers that provides visibility into the user's journey to identify and mitigate exposure while initiating resource transfer requests.

There is a need for a system for enhanced authentication framework using multi-dimensional hashing.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for enhanced authentication framework using multi-dimensional hashing is presented. The system comprising: at least one non-transitory storage device; and at least one processing device coupled to the at least one non-transitory storage device, wherein the at least one processing device is configured to: electronically receive, from a computing device of a user, a resource transfer request; retrieve, from an authentication database, a multi-dimensional hash for a first set of data files for the user and a user identification artifact in response to receiving the resource transfer request; retrieve, from the computing device of the user, a second set of data files matching the user identification artifact; initiate an asynchronous hash processing engine on the second set of data files; generate, using the asynchronous hash processing engine, a multi-dimensional hash for the second set of data files; compare the multi-dimensional hash for the first set of data files with the multi-dimensional hash for the second set of data files to determine a match; and authorize the resource transfer request based on at least determining the match.

In some embodiments, the at least one processing device is further configured to: electronically receive, from the computing device of the user, a registration request to be eligible to initiate the resource transfer request; electronically receive, from the computing device of the user, the user identification artifact; crawl one or more databases associated with the computing device of the user to retrieve the first set of data files matching the user identification artifact; generate, using the asynchronous hash processing engine, the multi-dimensional hash for the first set of data files; and store the multi-dimensional hash for the first set of data files in the authentication database.

In some embodiments, retrieving the first set of data files matching the user identification artifact further comprises: determining that the user identification artifact is associated with an image of the user; initiating a facial recognition algorithm on the image of the user; crawling the one or more databases associated with the computing device of the user to retrieve one or more data files; and determining, using the facial recognition algorithm, the first set of data files from the one or more data files, wherein the first set of data files contain images that match the image of the user.

In some embodiments, generating the multi-dimensional hash for the first set of data files further comprises: initiating the asynchronous hash processing engine on the first set of data files; assigning, using the asynchronous hash processing engine, a unique hash value for each data file associated with the first set of data files; and generating an array of unique hash values for the first set of data files.

In some embodiments, the at least one processing device is further configured to: determine a partial match between the multi-dimensional hash for the first set of data files for the user and the multi-dimensional hash for the second set of data files; determine that a quantitative measure of the partial match is greater than a predetermined threshold; and authorize the resource transfer request based on at least determining that the quantitative measure of the partial match is greater than the predetermined threshold.

In some embodiments, the at least one processing device is further configured to: determine that the quantitative measure of the partial match is lesser than the predetermined threshold; initiate an exposure mitigation engine in response to determining that the quantitative measure of the partial match is lesser than the predetermined threshold; determine, using the exposure mitigation engine, that the user is authorized to initiate the resource transfer request; and authorize the resource transfer request based on at least determining that the user is authorized to initiate the resource transfer request.

In some embodiments, determining that the user is authorized to initiate the resource transfer request further comprises: initiating, via the computing device of the user, a request for one or more authentication credentials to the user; receiving, via the computing device of the user, the one or more authentication credentials in response to the request; validating the one or more authentication credentials; and determining that the user is authorized to initiate the resource transfer request.

In some embodiments, validating the one or more authentication credentials further comprises: determining an authorization level of the user based on at least the one or more authentication credentials; determining an authorization requirement associated with initiating the resource transfer request; determining that the authorization level of the user meets the authorization requirement associated with initiating the resource transfer request; and determining that the user is authorized to initiate the resource transfer request based on at least determining that the authorization level of the user meets the authorization requirement associated with initiating the resource transfer request.

In another aspect, a computer program product for enhanced authentication framework using multi-dimensional hashing is presented. The computer program product comprising a non-transitory computer-readable medium comprising code causing a first apparatus to: electronically receive, from a computing device of a user, a resource transfer request; retrieve, from an authentication database, a multi-dimensional hash for a first set of data files for the user and a user identification artifact in response to receiving the resource transfer request; retrieve, from the computing device of the user, a second set of data files matching the user identification artifact; initiate an asynchronous hash processing engine on the second set of data files; generate, using the asynchronous hash processing engine, a multi-dimensional hash for the second set of data files; compare the multi-dimensional hash for the first set of data files with the multi-dimensional hash for the second set of data files to determine a match; and authorize the resource transfer request based on at least determining the match.

In yet another aspect, a method for enhanced authentication framework using multi-dimensional hashing is presented. The method comprising: electronically receive, from a computing device of a user, a resource transfer request; retrieving, from an authentication database, a multi-dimensional hash for a first set of data files for the user and a user identification artifact in response to receiving the resource transfer request; retrieving, from the computing device of the user, a second set of data files matching the user identification artifact; initiating an asynchronous hash processing engine on the second set of data files; generating, using the asynchronous hash processing engine, a multi-dimensional hash for the second set of data files; comparing the multi-dimensional hash for the first set of data files with the multi-dimensional hash for the second set of data files to determine a match; and authorizing the resource transfer request based on at least determining the match.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Peer-to-peer (P2P) payments are instant digital transfers that make it simple and secure to transact with friends, family, trusted businesses and professionals without a dedicated payment instrument such as a card, or check, or traditional multi-step wire transfer process. Authenticated access to current peer-to-peer digital payment networks typically require means of identification that are often also used in other transactions, thus reducing their effectiveness in being strong authentication credentials. Therefore, there is a need to identify other means of authentication that may be in the form of invisible layers that provides visibility into the user's journey to identify and mitigate exposure while initiating resource transfer requests.

The present invention provides the functional benefit of implementing cryptographic hashing techniques to capture a first snapshot of the user's mobile device when the user is initially registering to be eligible to use the peer-to-peer digital payment network with the entity. Once registered, each time the user launches a resource transfer request (e.g., a peer-to-peer transaction), the system of the present invention implements similar cryptographic hashing techniques to capture a snapshot of the user's mobile device. These snapshots are then compared to the first snapshot to determine a match. If the matching values are within a tolerable limit (threshold), then the resource transfer request is authorized automatically. On the other hand, if the matching values are outside the tolerable limit, then additional authentication is required before authorizing the resource transfer request.

Figure 1:
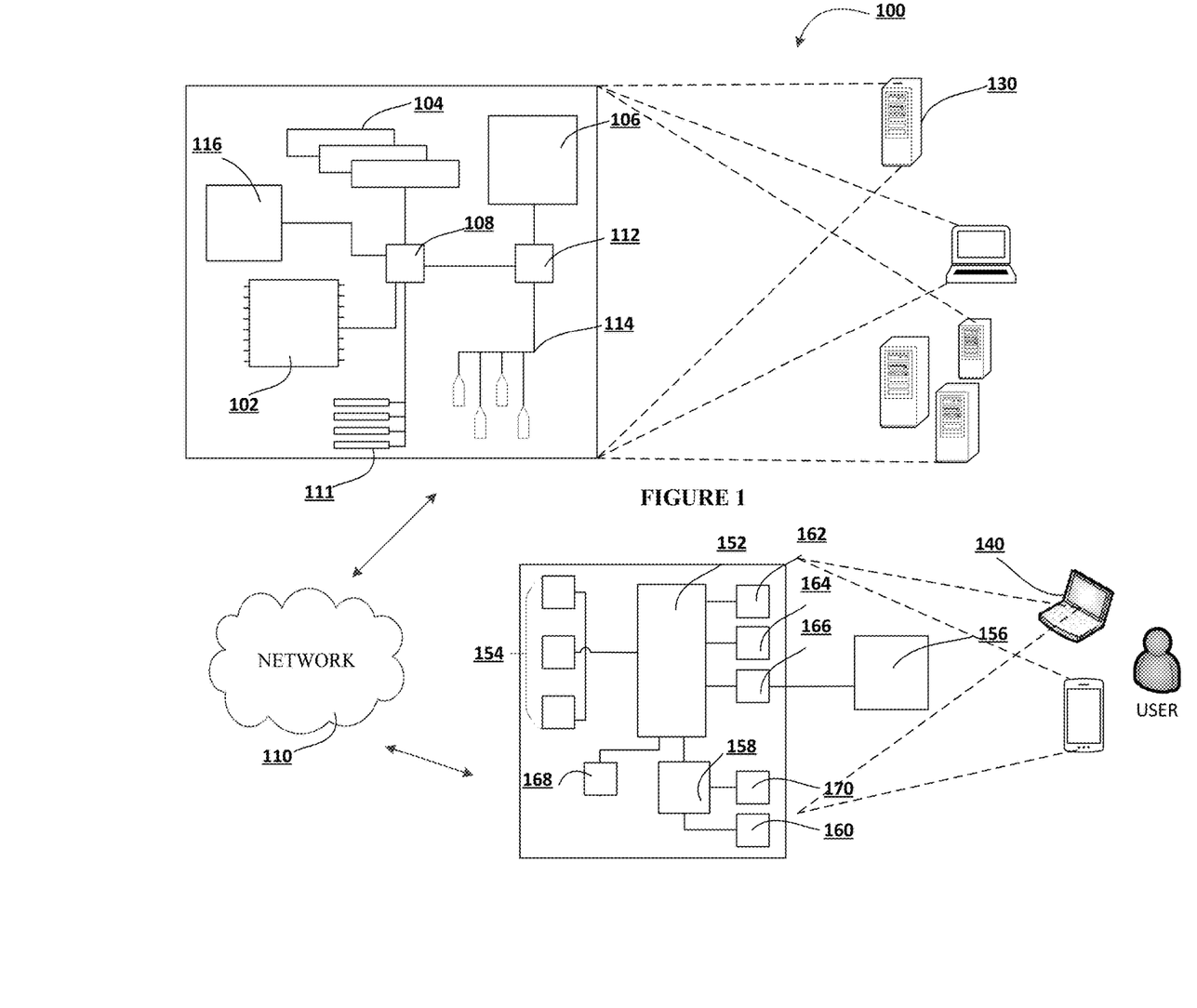
FIG. 1 illustrates technical components of a system for enhanced authentication framework using multi-dimensional hashing, in accordance with an embodiment of the invention.

FIG. 1 presents an exemplary block diagram of the system environment for enhanced authentication framework using multi-dimensional hashing 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion.

Likewise, in some embodiments, some or all of the portions of the system 130 may be separated into two or more distinct portions.

Figure 2:
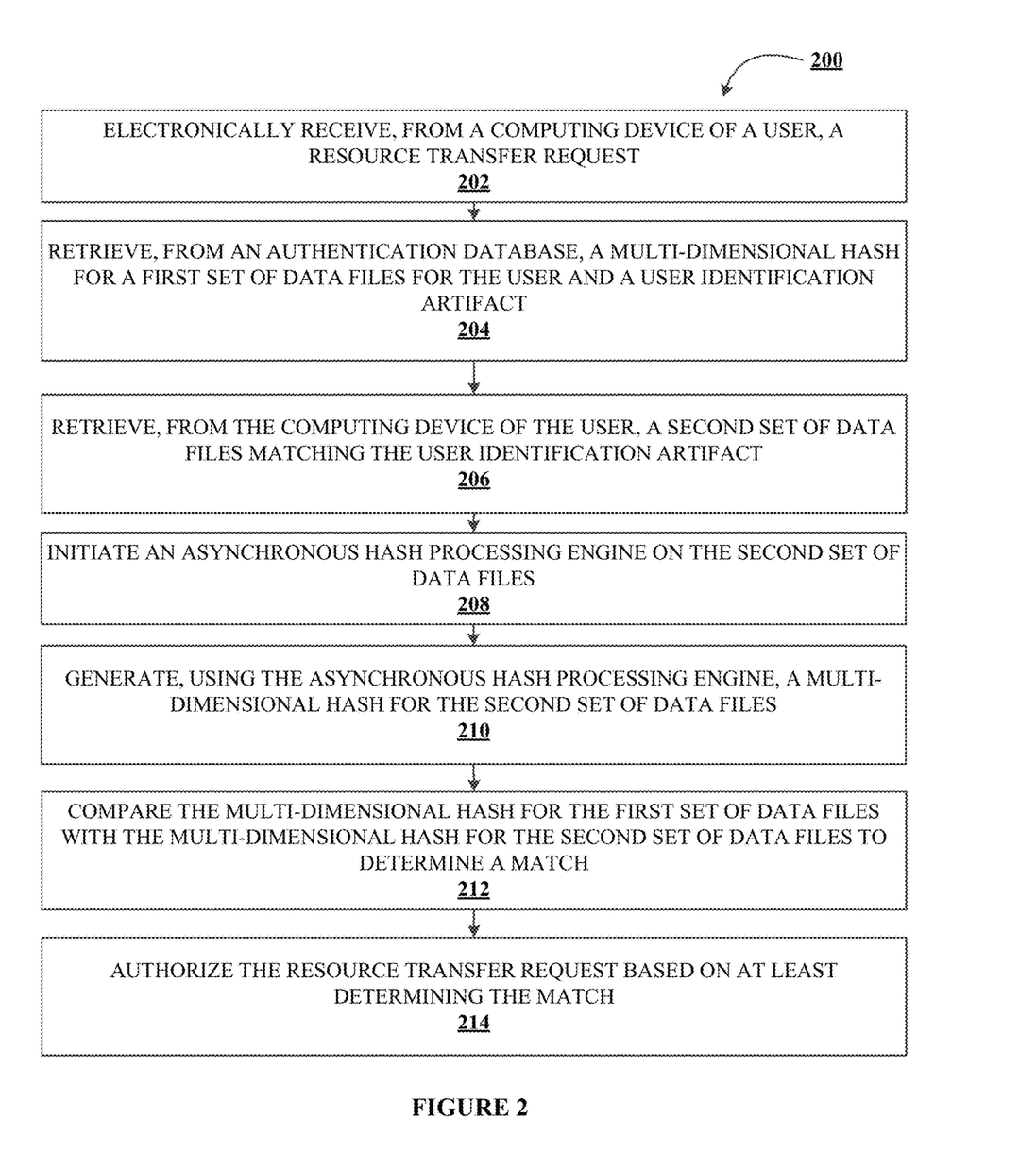
FIG. 2 illustrates a process flow for enhanced authentication framework using multi-dimensional hashing, in accordance with an embodiment of the invention.

FIG. 2 illustrates a process flow for enhanced authentication framework using multi-dimensional hashing 200, in accordance with an embodiment of the invention. As shown in block 202, the process flow includes electronically receiving, from a computing device of a user, a resource transfer request. By way of an example, a resource transfer request may be a request to launch a financial transaction involving direct or indirect movement of funds through traditional paper transaction processing systems (i.e. paper check processing) or through electronic transaction processing systems. A typical financial transaction may include a point of sale (POS) transaction, automated teller machine (ATM) transaction, person-to-person (P2P) transfer, internet transaction, online shopping, electronic funds transfers between accounts, transactions with a financial institution teller, personal checks, conducting purchases using loyalty/rewards points, and/or the like.

Next, as shown in block 204, the process flow includes retrieving, from an authentication database, a multi-dimensional hash for a first set of data files for the user and a user identification artifact in response to receiving the resource transfer request. In some embodiments, the first set of data files may refer to data files that are stored in the computing device of the user at the time the user initiates the registration request to be eligible to initiate the resource transfer request. The multi-dimensional hash for the first set of data files may refer to a unique array of hash values generated for the first set of data files. This array of hash values is unique to the user and is stored in the authentication database as a baseline for authentication purposes. The process of generating the multi-dimensional hash for the first set of data files for the user is described in more detail below (See FIG. 3).

Next, as shown in block 206, the process flow includes retrieving, from the computing device of the user, a second set of data files matching the user identification artifact. In some embodiments, the second set of data files may refer to data files that are stored in the computing device of the user at the time the user initiates the resource transfer request. In some embodiments, the second set of data files may include at least a portion of the first set of data files and additional data files aggregated by the user after the user has registered to be eligible to initiate resource transfer requests and until the user's launch of subsequent resource transfer requests. In specific embodiments, the second set of data files (and the additional data files) may be image files, video files, or data files that have images and/or videos embedded therein. For example, the second set of data files may be a set of images of the user taken during an event, a set of images of the user taken during a specific period of time when the user was on vacation, a set of images of the user distinguished by the geographical tag associated with them, a set of images taken during a predetermined period of time, a set of images where the user is the person present, a set of images where the user is part of a group of people, and/or the like.

Next, as shown in block 208, the process flow includes initiating an asynchronous hash processing engine on the second set of data files. In some embodiments, the asynchronous hash processing engine may be configured to implement hashing algorithms that are capable of mapping data of arbitrary size to fixed-sized hash values. Each hash value may be a unique identifier for any given piece of content.

Next, as shown in block 210, the process flow includes generating, using the asynchronous hash processing engine, a multi-dimensional hash for the second set of data files. By implementing the asynchronous hash processing engine on the second set of data files, each data file in the second set is mapped to a unique hash value. These unique hash values are then aggregated and arranged in an array to generate the multi-dimensional hash for the second set of data files. The asynchronous hash processing engine used to generate the multi-dimensional hash for the second set of data files is same or similar to the asynchronous hash processing engine that is used to generate the multi-dimensional hash for the first set of data files, described in more detail below (See FIG. 3).

Next, as shown in block 212, the process flow includes comparing the multi-dimensional hash for the first set of data files with the multi-dimensional hash for the second set of data files to determine a match. At any point in time, the data stored in the computing devices of users tend to be unique to that user. In particular, images stored in the computing devices of the users tend to be images related to that user, where the user is featured prominently. By generating the multi-dimensional hash for the first set of data files for the user when the user initially registers to be eligible to initiate the resource transfer request, the system may be configured to capture a snapshot of the computing device in the form of a multi-dimensional hash as a ground truth, i.e., information that is known to be real or true, provided by direct observation and measurement for authentication. Then, when the user initiates the resource transfer request at a later date, the system may be configured to generate the multi-dimensional hash for the second set of data files, and capture a snapshot of the computing device of the user at the time the user initiates the request. It is unlikely that a user often deletes or modifies the contents of their computing device to an extent where the snapshot captured at the time the user initiates the request is so different from the snapshot captured at the time the user initially registered to do so. If the two snapshots match, it is an indication that the user is using the same computing device that was initially registered to then initiate the resource transfer request.

Next, as shown in block 214, the process flow includes authorizing the resource transfer request based on at least determining the match. In some embodiments, the system may be configured to use the matching snapshots as an indication that the user is authorized to initiate the resource transfer request, and in response, authorize the resource transfer request. Those of skill in the art will recognize that this snapshot matching as a means of authentication may be used to augment existing authentication credential requirement or replace any existing authentication credential requirement described herein within the spirit and scope of the presently disclosed.

In some embodiments, the system may be configured to determine a partial match between the multi-dimensional hash for the first set of data files for the user and the multi-dimensional hash for the second set of data files. In one aspect, a partial match may be determined if a subset of the multi-dimensional hash for the first set of data files for the user and the multi-dimensional hash for the second set of data files match. In other words, the user has modified the contents of the computing device since using the computing device to initially register for eligibility. In such cases, the system may be configured to determine a quantitative measure of the partial match to measure of the degree of association or likeness between the multi-dimensional hash for the first set of data files for the user and the multi-dimensional hash for the second set of data files. For example, a quantitative measure may be a percentage, a ratio, a fraction, and/or the like. In response, the system may be configured to determine that the quantitative measure of the partial match is greater than a predetermined threshold. In response, the system may be configured to authorize the resource transfer request based on at least determining that the quantitative measure of the partial match is greater than the predetermined threshold.

On the other hand, if the quantitative measure is lesser than the predetermined threshold or there is no match between the multi-dimensional hash for the first set of data files for the user and the multi-dimensional hash for the second set of data files, the system may be configured to initiate an exposure mitigation engine to determine whether the user is authorized to initiate the resource transfer. In this regard, the system may be configured to initiate, via the computing device of the user, a request for one or more authentication credentials to the user. In response, the system may be configured to receive, via the computing device of the user, the one or more authentication credentials in response to the request. Next, having received the authentication credentials, the system may be configured to validate the one or more authentication credentials. In this regard, the system may be configured to determine an authorization level of the user based on at least the one or more authentication credentials. Next, the system may be configured to determine an authorization requirement associated with initiating the resource transfer request. Then, the system may be configured to determine that the authorization level of the user meets the authorization requirement associated with initiating the resource transfer request. If the authorization level of the user meets the authorization requirement associated with initiating the resource transfer request, the system may be configured to determine that the user is authorized to initiate the resource transfer request.

Figure 3:
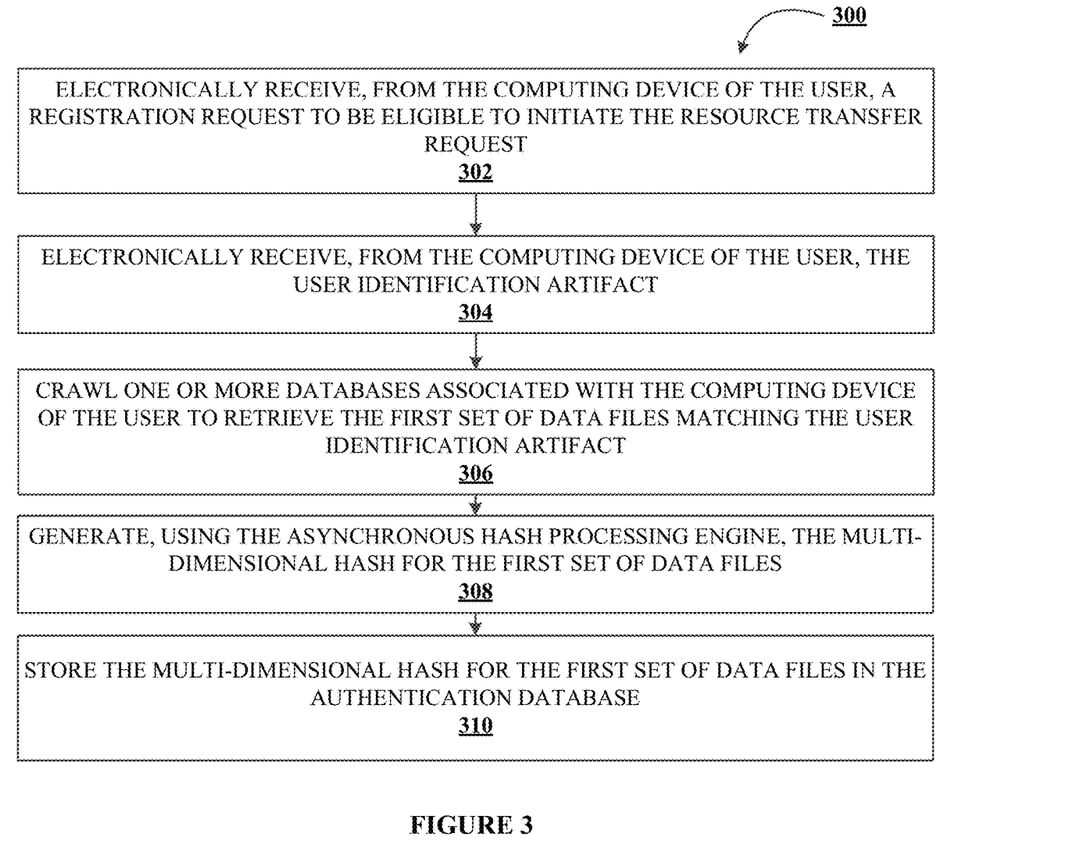
FIG. 3 illustrates a process flow for generating a multi-dimensional has for a set of data files, in accordance with an embodiment of the invention.

FIG. 3 illustrates a process flow for generating a multi-dimensional has for a set of data files 300, in accordance with an embodiment of the invention. As shown in block 302, the process flow includes electronically receiving, from the computing device of the user, a registration request to be eligible to initiate the resource transfer request. As described herein, typically, the user will have to go through a registration or onboarding process before being eligible to initiate the resource transfer request. During this process, the user will be assigned a set of authentication credentials, an authorization level, and access privileges related to initiating resource transfer requests.

Next, as shown in block 304, the process flow includes electronically receiving, from the computing device of the user, the user identification artifact. In some embodiments, as part of the onboarding process, the user may be asked to provide a user identification artifact. A user identification artifact may be any identity document that may be used to prove the user's identity and to connect the user to information about the user. In most cases, the user identification artifact may include an image of the user in addition to other information. Examples of user identification artifact may include a driving license, a passport, and/or any other identification issued by a regulatory body, such as the government.

Next, as shown in block 306, the process flow includes crawling one or more databases associated with the computing device of the user to retrieve the first set of data files matching the user identification artifact. As described herein, the first set of data files may refer to data files that are stored in the computing device of the user at the time the user initiates the registration request to be eligible to initiate the resource transfer request. Similar to the second set of data files, the first set of data files may be image files, video files, or data files that have images and/or videos embedded therein. As in the previous example, the first set of data files may be also be a set of images of the user taken during an event, a set of images of the user taken during a specific period of time when the user was on vacation, a set of images of the user distinguished by the geographical tag associated with them, a set of images taken during a predetermined period of time, a set of images where the user is the person present, a set of images where the user is part of a group of people, and/or the like.

In some embodiments, to retrieve the first set of data files that match the user identification artifact, the system may be configured to implement machine learning techniques, and more particularly, facial recognition techniques. Accordingly, the system may be configured to determine that the user identification artifact is associated with an image of the user. For example, the user identification artifact may be a driving license issued by the department of motor vehicles for the user. Typically, driving licenses include an image of the license holder. In some embodiments, the system may be configured to initiate a facial recognition algorithm (or any applicable machine learning algorithm) on the image of the user to capture facial features to form a facial signature. Having identified the facial signature, the system may then be configured to determine, using the facial recognition algorithm, the first set of data files from the computing device of the user that matches the facial signature. In other words, the first set of data files contain images that match the image of the user as identified in the user identification artifact.

Next, as shown in block 308, the process flow includes generating, using the asynchronous hash processing engine, the multi-dimensional hash for the first set of data files. In this regard, the system may be configured to initiate the asynchronous hash processing engine on the first set of data files. In response, the system may be configured to assign, using the asynchronous hash processing engine, a unique hash value for each data file associated with the first set of data files. In this regard, the asynchronous hash processing engine may be configured to implement one or more hash algorithms to calculate the unique hash value for each data file. Examples of hash algorithms may include MD5, SHA-1, SHA-256, SHA-512, and/or the like. In some embodiments, each hash algorithm uses a cryptographic hash function that takes a data file and produces a string (a sequence of numbers and letters) of a fixed length. If the data file is altered in or modified in any way, the resulting hash value will be different from the hash value of the original data file. In response, the system may be configured to aggregate each unique hash value to generate an array of unique hash values for the first set of data files.

Next, as shown in block 310, the process flow includes storing the multi-dimensional hash for the first set of data files in the authentication database. As described herein, this array of unique hash values can then be used as a baseline ("ground truth") for authentication purposes.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for enhanced authentication framework using multi-dimensional hashing, the system comprising:
   at least one non-transitory storage device; and
   at least one processing device coupled to the at least one non-transitory storage device, wherein the at least one processing device is configured to:
   electronically receive, from a computing device of a user, a resource transfer request;

retrieve, from an authentication database, a multi-dimensional hash for a first set of data files for the user and a user identification artifact in response to receiving the resource transfer request;
retrieve, from the computing device of the user, a second set of data files matching the user identification artifact;
initiate an asynchronous hash processing engine on the second set of data files;
generate, using the asynchronous hash processing engine, a multi-dimensional hash for the second set of data files;
compare the multi-dimensional hash for the first set of data files with the multi-dimensional hash for the second set of data files to determine a match; and
authorize the resource transfer request based on at least determining the match.

2. The system of claim 1, wherein the at least one processing device is further configured to:
electronically receive, from the computing device of the user, a registration request to be eligible to initiate the resource transfer request;
electronically receive, from the computing device of the user, the user identification artifact;
crawl one or more databases associated with the computing device of the user to retrieve the first set of data files matching the user identification artifact;
generate, using the asynchronous hash processing engine, the multi-dimensional hash for the first set of data files; and
store the multi-dimensional hash for the first set of data files in the authentication database.

3. The system of claim 2, wherein retrieving the first set of data files matching the user identification artifact further comprises:
determining that the user identification artifact is associated with an image of the user;
initiating a facial recognition algorithm on the image of the user;
crawling the one or more databases associated with the computing device of the user to retrieve one or more data files; and
determining, using the facial recognition algorithm, the first set of data files from the one or more data files, wherein the first set of data files contain images that match the image of the user.

4. The system of claim 1, wherein generating the multi-dimensional hash for the first set of data files further comprises:
initiating the asynchronous hash processing engine on the first set of data files;
assigning, using the asynchronous hash processing engine, a unique hash value for each data file associated with the first set of data files; and
generating an array of unique hash values for the first set of data files.

5. The system of claim 1, wherein the at least one processing device is further configured to:
determine a partial match between the multi-dimensional hash for the first set of data files for the user and the multi-dimensional hash for the second set of data files;
determine that a quantitative measure of the partial match is greater than a predetermined threshold; and
authorize the resource transfer request based on at least determining that the quantitative measure of the partial match is greater than the predetermined threshold.

6. The system of claim 5, wherein the at least one processing device is further configured to:

determine that the quantitative measure of the partial match is lesser than the predetermined threshold;
initiate an exposure mitigation engine in response to determining that the quantitative measure of the partial match is lesser than the predetermined threshold;
determine, using the exposure mitigation engine, that the user is authorized to initiate the resource transfer request; and
authorize the resource transfer request based on at least determining that the user is authorized to initiate the resource transfer request.

7. The system of claim 6, wherein determining that the user is authorized to initiate the resource transfer request further comprises:
initiating, via the computing device of the user, a request for one or more authentication credentials to the user;
receiving, via the computing device of the user, the one or more authentication credentials in response to the request;
validating the one or more authentication credentials; and
determining that the user is authorized to initiate the resource transfer request.

8. The system of claim 7, wherein validating the one or more authentication credentials further comprises:
determining an authorization level of the user based on at least the one or more authentication credentials;
determining an authorization requirement associated with initiating the resource transfer request;
determining that the authorization level of the user meets the authorization requirement associated with initiating the resource transfer request; and
determining that the user is authorized to initiate the resource transfer request based on at least determining that the authorization level of the user meets the authorization requirement associated with initiating the resource transfer request.

9. A computer program product for enhanced authentication framework using multi-dimensional hashing, the computer program product comprising a non-transitory computer-readable medium comprising code causing a first apparatus to:
electronically receive, from a computing device of a user, a resource transfer request;
retrieve, from an authentication database, a multi-dimensional hash for a first set of data files for the user and a user identification artifact in response to receiving the resource transfer request;
retrieve, from the computing device of the user, a second set of data files matching the user identification artifact;
initiate an asynchronous hash processing engine on the second set of data files;
generate, using the asynchronous hash processing engine, a multi-dimensional hash for the second set of data files;
compare the multi-dimensional hash for the first set of data files with the multi-dimensional hash for the second set of data files to determine a match; and
authorize the resource transfer request based on at least determining the match.

10. The computer program product of claim 9, wherein the first apparatus is further configured to:
electronically receive, from the computing device of the user, a registration request to be eligible to initiate the resource transfer request;
electronically receive, from the computing device of the user, the user identification artifact;

crawl one or more databases associated with the computing device of the user to retrieve the first set of data files matching the user identification artifact;

generate, using the asynchronous hash processing engine, the multi-dimensional hash for the first set of data files; and store the multi-dimensional hash for the first set of data files in the authentication database.

11. The computer program product of claim 10, wherein retrieving the first set of data files matching the user identification artifact further comprises:

determining that the user identification artifact is associated with an image of the user;

initiating a facial recognition algorithm on the image of the user;

crawling the one or more databases associated with the computing device of the user to retrieve one or more data files; and determining, using the facial recognition algorithm, the first set of data files from the one or more data files, wherein the first set of data files contain images that match the image of the user.

12. The computer program product of claim 9, wherein generating the multi-dimensional hash for the first set of data files further comprises:

initiating the asynchronous hash processing engine on the first set of data files;

assigning, using the asynchronous hash processing engine, a unique hash value for each data file associated with the first set of data files; and generating an array of unique hash values for the first set of data files.

13. The computer program product of claim 9, wherein the first apparatus is further configured to:

determine a partial match between the multi-dimensional hash for the first set of data files for the user and the multi-dimensional hash for the second set of data files;

determine that a quantitative measure of the partial match is greater than a predetermined threshold; and authorize the resource transfer request based on at least determining that the quantitative measure of the partial match is greater than the predetermined threshold.

14. The computer program product of claim 13, wherein the first apparatus is further configured to:

determine that the quantitative measure of the partial match is lesser than the predetermined threshold;

initiate an exposure mitigation engine in response to determining that the quantitative measure of the partial match is lesser than the predetermined threshold;

determine, using the exposure mitigation engine, that the user is authorized to initiate the resource transfer request; and authorize the resource transfer request based on at least determining that the user is authorized to initiate the resource transfer request.

15. The computer program product of claim 14, wherein determining that the user is authorized to initiate the resource transfer request further comprises:

initiating, via the computing device of the user, a request for one or more authentication credentials to the user;

receiving, via the computing device of the user, the one or more authentication credentials in response to the request;

validating the one or more authentication credentials; and determining that the user is authorized to initiate the resource transfer request.

16. The computer program product of claim 15, wherein validating the one or more authentication credentials further comprises:

determining an authorization level of the user based on at least the one or more authentication credentials;

determining an authorization requirement associated with initiating the resource transfer request;

determining that the authorization level of the user meets the authorization requirement associated with initiating the resource transfer request; and determining that the user is authorized to initiate the resource transfer request based on at least determining that the authorization level of the user meets the authorization requirement associated with initiating the resource transfer request.

17. A method for enhanced authentication framework using multi-dimensional hashing, the method comprising:

electronically receive, from a computing device of a user, a resource transfer request;

retrieving, from an authentication database, a multi-dimensional hash for a first set of data files for the user and a user identification artifact in response to receiving the resource transfer request;

retrieving, from the computing device of the user, a second set of data files matching the user identification artifact;

initiating an asynchronous hash processing engine on the second set of data files;

generating, using the asynchronous hash processing engine, a multi-dimensional hash for the second set of data files;

comparing the multi-dimensional hash for the first set of data files with the multi-dimensional hash for the second set of data files to determine a match; and authorizing the resource transfer request based on at least determining the match.

18. The method of claim 17, wherein the method further comprises:

electronically receiving, from the computing device of the user, a registration request to be eligible to initiate the resource transfer request;

electronically receiving, from the computing device of the user, the user identification artifact;

crawling one or more databases associated with the computing device of the user to retrieve the first set of data files matching the user identification artifact;

generating, using the asynchronous hash processing engine, the multi-dimensional hash for the first set of data files; and storing the multi-dimensional hash for the first set of data files in the authentication database.

19. The method of claim 18, wherein retrieving the first set of data files matching the user identification artifact further comprises:

determining that the user identification artifact is associated with an image of the user;

initiating a facial recognition algorithm on the image of the user;

crawling the one or more databases associated with the computing device of the user to retrieve one or more data files; and determining, using the facial recognition algorithm, the first set of data files from the one or more data files, wherein the first set of data files contain images that match the image of the user.

20. The method of claim 17, wherein generating the multi-dimensional hash for the first set of data files further comprises:
- initiating the asynchronous hash processing engine on the first set of data files;
- assigning, using the asynchronous hash processing engine, a unique hash value for each data file associated with the first set of data files; and
- generating an array of unique hash values for the first set of data files.

* * * * *